United States Patent Office 2,758,054
Patented Aug. 7, 1956

2,758,054

SUBSTITUTED 1 - BENZOYL - 2 - PHENYL HYDRAZINE FUNGICIDAL COMPOSITIONS AND METHOD OF APPLYING TO PLANTS

Allen E. Smith, Oxford, George E. O'Brien, Bethany, and Adelaide Bornmann, New Haven, Conn., assignors to United States Rubber Company, New York, N. Y., a corporation of New Jersey No Drawing. Application March 17, 1953,
Serial No. 342,984

9 Claims. (Cl. 167—30)

This invention relates to new and useful improvements in fungicides. The invention further relates to methods of treating growing plants, and to methods of protecting organic material subject to attack by microorganisms, as the immunizing of seed.

We have found that substituted 1-benzoyl-2-phenyl hydrazines having a plurality of substituents, at least one substituent being in the benzoyl group and selected from halo, nitro, hydroxy, carboxy, alkoxy and alkyl radicals and at least one substituent being in the phenyl group and selected from halo, nitro and alkyl radicals are effective fungicides.

The chemicals may be made by reacting equal molar amounts of the selected substituted phenyl hydrazine and a halide, anhydride or ester of the selected substituted benzoic acid.

The chemicals of the present invention may be used as seed protectants and disinfectants, and to protect growing plants from fungus infection. They may be applied to seeds and plants directly, or in an inert medium as a dust in admixture with a powdered solid carrier, such as the various mineral silicates, e. g. mica, talc, prophyllite and clays. They may be applied as aqueous sprays in suspension in water. They may be applied in admixture with small amounts of a surface-active agent which may be an anionic surface-active agent, a nonionic surface-active agent, or a cationic surface-active agent, and which acts as a wetting agent for the chemical. Such surface-active agents are well known and reference is made to U. S. Patent 2,547,724, columns 3 and 4, for more detailed examples of the same. They may be applied as in foliage treatment in an aqueous suspension containing such a surface-active agent as a dispersing agent. The chemicals of the invention may also be admixed with powdered solid carriers, such as mineral silicates, together with a small amount of such a surface-active agent so that a wettable powder may be obtained which may be applied directly to plants, or which may be shaken up with water to readily prepare a suspension of the chemical (and powdered carrier) in water for application to plants in that form. The chemicals may be applied to the plants by the aerosol method.

The following is illustrative of the preparation of the chemicals of the invention:

Preparation of 1-(2-chlorobenzoyl)-2-(4-tolyl) hydrazine

A stirred solution of 4-tolylhydrazine (12.2 g., 0.1 mole) and pyridine (8 g., 0.1 mole) in 400 ml. of dry ether was treated with a solution of 2-chlorobenzoyl chloride (17.5 g., 0.1 mole) in 50 ml. of dry ether. The reaction mixture was refluxed for 3 hours, cooled and filtered. The solid white product was crystallized twice from alcohol, giving 11 g. of colorless crystals, M. P. 162–165° C. Analysis.—calculated for $C_{14}H_{13}ON_2Cl$: N, 10.75%; Cl 13.63%. Found: N, 10.4%; Cl, 13.8%.

Preparation of 1-(2-chlorobenzoyl)-2-(4-chlorophenyl) hydrazine

A stirred solution of 4-chlorophenylhydrazine (14.3 g., 0.1 mole) and pyridine (8 g., 0.1 mole) in 200 ml. of dry ether was treated with a solution of 2-chlorobenzoyl chloride (17.5 g., 0.1 mole) in 200 ml. of dry ether. After refluxing for three hours the mixture was cooled and filtered. The solid white product was crystallized twice from alcohol giving 15 g. of white needles, M. P. 186–186.5° C. Analysis.— calculated for $C_{13}H_{10}ON_2Cl_2$: Cl, 25.27%. Found Cl, 24.9%.

Preparation of 1-(2-carboxybenzoyl)-2-(4-chlorophenyl) hydrazine

A slurry of phthalic anhydride (11 g., .075 mole) and 4-chlorophenylhydrazine (10 g., .075 mole) in 135 ml. of chloroform was stirred for two hours, then the white solid was collected by filtration. Yield 20 g. M. P. 163–167° C. with evolution of gas (water evolved as the product cyclicizes).

The cyclicized product was analyzed. Calculated for $C_{14}H_9O_2N_2Cl$; Cl, 12.65%. Found: Cl, 13.1%.

Preparation of 1-(2-carboxybenzoyl)-2-(4-tolyl) hydrazine

A solution of phthalic anhydride (10 g., .75 mole) and 4-tolylhydrazine (8.3 g., 0.75 mole) in 500 ml. of chloroform was allowed to stand 18 hours at room temperature. The product (4 g.) separated as an off-white solid which melted with evolution of a gas (water) at about 160° C.

Preparation of 1-(2-nitrobenzoyl)-2-(4-chlorophenyl) hydrazine

A stirred solution of 4-chlorophenylhydrazine (8 g., .056 mole) and pyridine (5 g., .06 mole) in 80 ml. of dry ether was treated with a solution of o-nitrobenzoyl chloride (10 g., .056 mole) in 20 ml. of dry ether. After 30 minutes the reaction mixture was quenched in water. The solids and ether layer were taken up in 100 ml. of benzene, stripped of ether, and cooled. The product (4 g.) crystallized as cottony white needles, M. P. 185–187° C. Analysis.—calculated as $C_{13}H_{10}O_3N_3Cl$: N, 14.4%. Found N, 14.3%.

There may be more than one, generally not over two, substituents in the benzoyl group and more than one, generally not over two, substituents in the phenyl group in the chemicals of the present invention.

The effectiveness of the chemicals of the invention as fungicides is illustrated in the following:

The chemicals to be tested were ground with 7.5% by weight of the chemical of an alkyl phenoxy polyoxyethylene ethanol (monoether of a polyglycol with an alkylated phenol) which is a surface-active agent known to possess no fungicidal properties in the amounts used. The mixture of surface-active agent and test chemical was dispersed by agitating in distilled water at a concentration of 2000 parts per million of the chemical.

Duplicate six inch tomato plants of the variety Bonny Best were sprayed for 20 seconds at 20 pounds pressure with the thus prepared aqueous suspension of each fungicide. After the spray deposit was thoroughly dry (24 hours), the plants and four comparable untreated (check) plants were sprayed with an aqueous suspension of spores of the early blight fungus (Alternaria solani). The plants were held for 24 hours at 21° C. and 100 percent relative humidity to permit spore germination and host infection before removing the plants to the greenhouse. Records were taken 5 days later on the number of lesions produced on the 15 major leaflets of the three youngest fully expanded leaves. These data were converted to percentage of control on the basis of the average number of fungus lesions on the four check plants.

The percent fungus control by the various chemicals of the invention is shown in the following table:

| Treatment Chemical | Percent Fungus Control |
| --- | --- |
| 1-(2-chlorobenzoyl)-2-(2-tolyl) hydrazine | 50 |
| 1-(2-chlorobenzoyl)-2-(3-tolyl) hydrazine | 80 |
| 1-(2-chlorobenzoyl)-2-(4-tolyl) hydrazine | 99 |
| 1-(2-chlorobenzoyl)-2-(4-chlorophenyl) hydrazine | 99 |
| 1-(2-carboxybenzoyl)-2-(4-tolyl) hydrazine | 95 |
| 1-(2-carboxybenzoyl)-2-(4-nitrophenyl) hydrazine | 80 |
| 1-(2-carboxybenzoyl)-2-(2, 4-dinitrophenyl) hydrazine | 62 |
| 1-(2-carboxybenzoyl)-2-(4-chlorophenyl) hydrazine | 81 |
| 1-(2-carboxybenzoyl)-2-(2, 5-dichlorophenyl) hydrazine | 91 |
| 1-(2-nitrobenzoyl)-2-(4-chlorophenyl) hydrazine | 99 |
| 1-(2-hydroxybenzoyl)-2-(4-chlorophenyl) hydrazine | 88 |
| 1-(2-methylbenzoyl)-2-(2-chlorophenyl) hydrazine | 77 |
| 1-(3-chlorobenzoyl)-2-(4-chlorophenyl) hydrazine | 52 |
| 1-(3-nitrobenzoyl)-2-(4-chlorophenyl) hydrazine | 34 |
| 1-(4-chlorobenzoyl)-2-(4-chlorophenyl) hydrazine | 52 |

It may be seen from the above that in general the most effective fungicides of the invention are those having a substituent in the benzoyl group in position ortho to the carbonyl group.

Having thus described our invention, what we claim and desire to protect by Letters Patent is:

1. The method of controlling fungi on plants which comprises applying to plants that are subject to attack by fungi a fungicidal amount of a 1-benzoyl-2-phenyl hydrazine having only one substituent in the benzoyl group, said substituent being selected from the group consisting of chloro, nitro, hydroxy, carboxy and methyl radicals and having one substituent in the phenyl group selected from the group consisting of chloro, nitro and methyl radicals and not more than one other substituent in the phenyl group selected from the group consisting of chloro and nitro.

2. The method for suppressing the growth of fungi on living plants which comprises spraying living plants which are subject to attack by fungi with a fungicidal amount of a 1-benzoyl-2-phenyl hydrazine having only one substituent in the benzoyl group, said substituent being selected from the group consisting of chloro, nitro, hydroxy, carboxy and methyl radicals and having one substituent in the phenyl group selected from the group consisting of chloro, nitro and methyl radicals and not more than one other substituent in the phenyl group selected from the group consisting of chloro and nitro.

3. A fungicidal composition comprising a 1-benzoyl-2-phenyl hydrazine having only one substituent in the benzoyl group, said substituent being selected from the group consisting of chloro, nitro, hydroxy, carboxy and methyl radicals and having one substituent in the phenyl group selected from the group consisting of chloro, nitro and methyl radicals and not more than one other substituent in the phenyl group selected from the group consisting of chloro, nitro and a fungicidal adjuvant therefor, said adjuvant comprising a surface-active wetting agent.

4. The fungicidal composition of claim 3 in which the adjuvant includes a powdered solid carrier.

5. A fungicidal composition comprising 1-(2-chlorobenzoyl)-2-(4-chlorophenyl) hydrazine and a fungicidal adjuvant therefor, said adjuvant comprising a surface-active wetting agent.

6. A fungicidal composition comprising 1-(2-chlorobenzoyl)-2-(4-tolyl) hydrazine and a fungicidal adjuvant therefor, said adjuvant comprising a surface-active wetting agent.

7. A fungicidal composition comprising 1-(2-carboxybenzoyl)-2-(4-chlorophenyl) hydrazine and a fungicidal adjuvant therefor, said adjuvant comprising a surface-active wetting agent.

8. A fungicidal composition comprising 1-(2-carboxybenzoyl)-2-(4-tolyl) hydrazine and a fungicidal adjuvant therefor, said adjuvant comprising a surface-active wetting agent.

9. A fungicidal composition comprising 1-(2-nitrobenzoyl)-2-(4-chlorophenyl) hydrazine and a fungicidal adjuvant therefor, said adjuvant comprising a surface-active wetting agent.

References Cited in the file of this patent

FOREIGN PATENTS 460,521    Great Britain ------------------ 1937

OTHER REFERENCES

Bottger et al.: Chem. Ab., vol. 43, page 5525 (1949).
Beilstein: vol. 15, pages 257 and 274.
Siegler et al.: Journal of Economic Entomology, vol. 39, No. 3, June 1946, pages 416, 417.
Journal of Econ. Entomology, vol. 33, No. 4, Aug. 1940, pages 670–674.